United States Patent [19]
Ballard

[11] Patent Number: 6,078,960
[45] Date of Patent: Jun. 20, 2000

[54] CLIENT-SIDE LOAD-BALANCING IN CLIENT SERVER NETWORK

[75] Inventor: Clinton L. Ballard, Suquamish, Wash.

[73] Assignee: Acceleration Software International Corporation, Poulsbo, Wash.

[21] Appl. No.: 09/108,139

[22] Filed: Jul. 3, 1998

[51] Int. Cl.⁷ .................................................. G06F 15/16
[52] U.S. Cl. .......................... 709/229; 709/203; 709/219; 709/226; 709/239; 709/242
[58] Field of Search ................................ 709/203, 219, 709/229, 226, 239, 242

[56] References Cited

U.S. PATENT DOCUMENTS

| | | | |
|---|---|---|---|
| 5,341,477 | 8/1994 | Pitkin et al. | 709/203 |
| 5,774,660 | 6/1998 | Brendel et al. | 709/201 |
| 5,828,847 | 10/1998 | Gehr et al. | 709/239 |
| 5,938,732 | 8/1999 | Lim et al. | 709/229 |
| 5,951,694 | 9/1999 | Choquier et al. | 714/15 |

Primary Examiner—Zarni Maung
Assistant Examiner—Saleh Najjar
Attorney, Agent, or Firm—Steve P. Koda

[57] ABSTRACT

Load balancing is achieved at the client side, rather than at the server side of a client-server network. Each client computer regularly receives a load balance list, enumerating respective addresses of multiple server computers. Each client computer executes a server selection function which determines the average load for each server in the list. In the event of a server computer failure, a system administrator can remove the server computer from the load balance list and reapportion the load. The client computer's list then is updated when the list is received during subsequent access. In the event a client computer determines that a server is non-responsive, such server is removed from the load balance list for the client computer which made such determination. The client computer also stores a back-up list of servers for use when all servers on the load balance list are non-responsive.

8 Claims, 4 Drawing Sheets

LOAD BALANCE LIST ⬈ 54

ISP SERVER 1 - 25%
ISP SERVER 2 - 25%
ISP SERVER 3 - 25%
ISP SERVER 4 - 25%

FIG.4A

UPDATED LOAD BALANCE LIST ⬈ 54

ISP SERVER 1 - 10%
ISP SERVER 2 - 20%
ISP SERVER 3 - 20%
ISP SERVER 4 - 20%
ISP SERVER 5 - 30%

FIG.4B

EMERGENCY BACK-UP LOAD BALANCE LIST ⬈ 76

ABC COMPANY SERVER 1 - 50%
ABC COMPANY SERVER 2 - 50%

FIG.5

CLIENT-SIDE LOAD-BALANCING IN CLIENT SERVER NETWORK

BACKGROUND OF THE INVENTION

This invention relates to client server computer networks having a plurality of network server computers, and more particularly to a method and apparatus for balancing the load on respective network server computers in the network.

In large client server networks such as the INTERNET, many client computers seek to access the same network server computer at a given time. To do so, each client computer issues an access request which specifies an address for the server computer. When too many clients attempt to access the same server computer at a given time, response time slows as the server handles a queue of requests. To handle the load, it is common for INTERNET service providers to include multiple computers which are linked together to have the same address. For example, a hardware device may respond to all requests to a given address and forward the respective requests to any one of a plurality of redundant network servers. Such hardware device balances the load among the redundant servers allowing response time to be maintained at a desirable speed. Such a hardware device typically handles 16, 64 or 128 servers. To assure that the client is able to access desired data, all accessible data is to be redundantly located on each server computer having the same address. Thus, the multiple servers sharing a common physical address on the client server network are referred to herein as redundant servers.

One shortcoming of this hardware based load balancing approach is that all requests to the server address are routed through a common pipeline (i.e., the hardware load balancing device). Thus, associated with this single point of load balancing control is a single point of failure. In the event of a natural disaster or a prolonged power outage at the hardware load balancing device, client computers are unable to access the desired data at any of the redundant server computers. Accordingly, there is a need for an alternative, more reliable, more flexible technique for achieving load balancing of client demand.

SUMMARY OF THE INVENTION

According to the invention, load balancing of client demand is achieved at the client side of the network connection in software, rather than at the server side. Each client computer receives a load balance list, enumerating varying, respective addresses of multiple server computers storing a common set of data. Each client computer executes a server selection function to determine which server to access.

According to one aspect of the invention, the same data is available from each one of a plurality of server computers having differing addresses. The client computer performs the server selection function to determine which server is to be addressed to access the data. All server requests (to participating servers) are handled by the server selection function, unless a prior selection has already been made for the current session, day or other unit of time or access.

According to another aspect of the invention, the load balance list includes the respective addresses of each one of the plurality of servers which stores the common data. The selection function allocates the load used by the client computer for each server in the list. Over time, the client computer selects each one of the servers in the load balance list by a given load percentage for the respective server. The load percentage may be specified within the load balance list or may be derived by the server selection function.

In a preferred embodiment each client computer receives the same load balance list. In such case, the more client computers there are, the better the server selection functions converge actual load balance percentages to the specified load balance percentages at any given time for the network.

According to another aspect of the invention, a system administrator for the network servers storing the common data may update the load balance list. For example, in the event of a server computer failure, server computer maintenance or another reason, the system administrator can remove one or more server computer identifications from the load balance list and reapportion the load. The system administrator then downloads the updated load balance list to each operational server. When a client computer accesses one of the server computers and re-obtains a load balance list, the client computer receives the updated load balance list.

According to another aspect of the invention, in the event a client computer determines that a server is non-responsive, such server is removed from the local load balance list of the client computer which made such determination. As a result, traffic from such client computer is automatically diverted to other servers that are functioning. Eventually when the client computer reobtains a load balance list from another server, an updated list will be available for the client computer, (assuming the system administrator independently has already determined that such non-responsive server is down).

According to another aspect of the invention, the load balance list can be any arbitrary length. Thus, there need not be 16, 64 or 128 servers as required in conventional hardware load balancing devices which achieve load balancing from the server side. The number of the servers can be varied as needed. An advantage of this method is that additional servers can be added or removed simply and easily.

According to another aspect of the invention, there is an additional emergency list of servers which is used in the event all servers on the load balance list are deemed non-responsive. An advantage of the emergency list scheme is that a vendor may choose to own the lines and addresses for the servers on the emergency list, but rent the lines from an independent service provider for the servers in the normal load balance list. As a result, a vendor is not held hostage to the addresses which the independent service provider owns. More specifically if the vendor chooses to switch service providers because of price, service or another reason, the vendor can do so without adversely impacting client access to the vendor's data. The vendor simply updates the load balance list. Even absent a transition time to get updated load balance lists to the client computers, a client that has not checked in for a while will still get to the emergency list and then get an updated load balance list. An economical benefit of this approach is that a vendor can spread their load among many (e.g., 100) independent service providers purchasing a minimal load (e.g., 5%) load on each independent service provider (ISP) computer at a substantially reduced price, instead of purchasing a large load (e.g., 50%) on a small number (e.g., 10) of ISP computers.

According to another aspect of the invention, an additional method for load balancing is achieved by specifying a maximum frequency of requests (e.g., xx requests/minute) at which a server can be accessed. By halving such frequency, double the number of client computers can access the servers without altering the load balance among the servers.

According to another advantage of this invention, the client side load balancing method does not suffer from a single point of failure which cripples the entire delivery system. With servers located in different geographic regions, even natural disasters and power failures at one or more servers will not disable network delivery of data to an operable client computer. Servers can be added or removed in a smooth transition without disrupting delivery of data. Load can be spread among hundreds of servers at reduced cost to the vendor. Vendors can ramp up or ramp down throughput capacity as needed using load capacity of independent service provider computers.

These and other aspects and advantages of the invention will be better understood by reference to the following detailed description taken in conjunction with the accompanying drawings.

BRIEF DESCRIPTION OF THE DRAWINGS

FIGS. 4A–B are a diagram of an exemplary load balance list and updated load balance list;

FIG. 5 is a diagram of an exemplary emergency back-up load balance list; and

DESCRIPTION OF SPECIFIC EMBODIMENTS
Overview—Host Network

The load balancing method of this invention is implemented in a client-server network of server computers and client computers. Wide area networks such as the internet, and similar intranets, are being used increasingly for accessing information and for communicating among individuals and businesses according to a client server model. Conventionally, a client computer accesses the network by a wired or a wireless transfer medium. A user accesses the internet, for example, using a modem and the standard telephone communication network Alternative carrier systems such as cable and satellite communication systems also are being contemplated for delivery of internet and wide area network services. The formal definition of the "Internet" is the global information system that (i) is logically linked together by a globally unique address space based on the Internet Protocol (IP) or its subsequent extensions/follow-ons; (ii) is able to support communications using the Transmission Control Protocol/Internet Protocol (TCP/IP) suite or its subsequent extensions/follow-ons, and/or other IP-compatible protocols; and (iii) provides, uses or makes accessible, either publicly or privately, high level services layered on the communications and related infrastructure. The term "Internet" is commonly used to refer to the physical structure, including client and server computers and the phone lines that connect everything into a global information system. The common categories of information services available over the internet include information retrieval services, information search services, communication services, and multimedia information services. The information retrieval services include FTP and Gopher. The information search services include WAIS, Archie, and Veronica. The communication services include Email, Telnet, USENET, and IRC. The multimedia information services include the World Wide Web (WWW).

Figure 1:
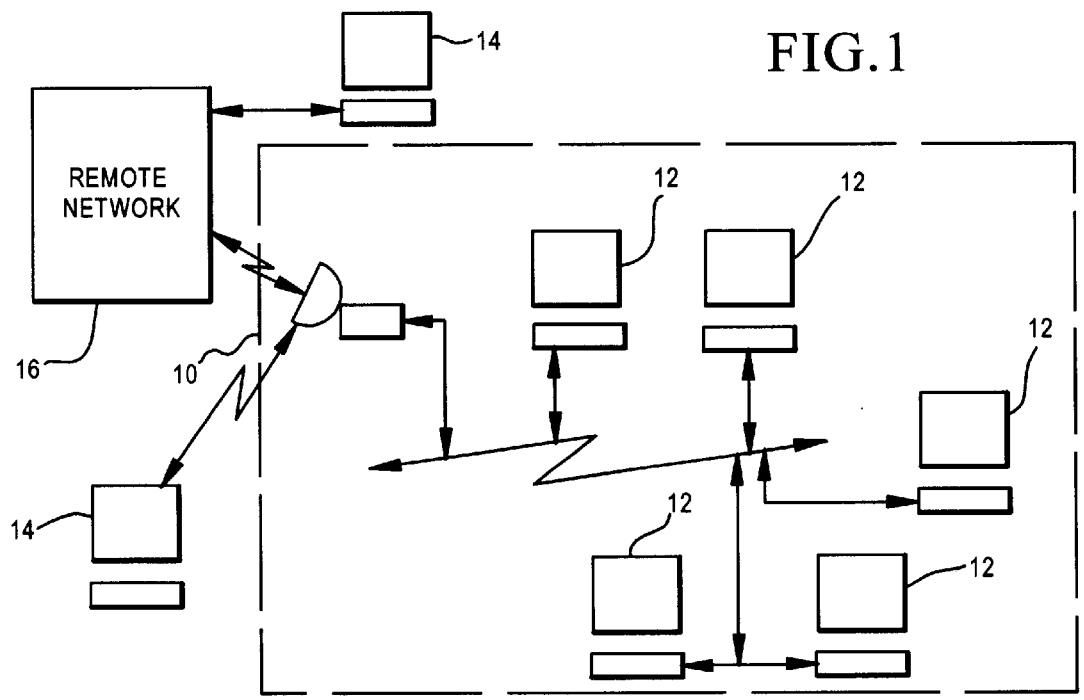
FIG. 1 is a schematic diagram of an exemplary client-server network hosting the method of this invention.

FIG. 1 shows a client-server network 10 formed by a plurality of network server computers 12 which are interlinked. Each network server computer 12 stores data accessible to other network server computers 12 and to client computers 14 and networks 16 which link into the wide area network 10. The configuration of the client-server network 10 may change over time as client computers 14 and one or more networks 16 connect and disconnect from the network 10, and as one or more trunk line server computers 12 are added or removed from the network 10. For example, when a client computer 14 and a network 16 are connected with the network servers computers 12, the client-server network includes such client computer 14 and network 16. As used herein the term computer includes any device or machine capable of accepting data, applying prescribed processes to the data, and supplying results of the processes.

The client-server network 10 stores information which is accessible to the network server computers 12, remote networks 16 and client computers 14. The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the client-server network 10 using a modem and the standard telephone communication network. Alternative carrier systems such as cable and satellite communication systems also may be used to link into the client-server network 10. Still other private or time-shared carrier systems may be used. In one embodiment the network 10 is a global information network, such as the internet. In another embodiment the network is a private intranet using similar protocols as the internet, but with added security measures and restricted access controls. In still other embodiments the network 10 is a private, or semi-private network using proprietary communication protocols.

The client computer 14 is any end user computer, and may also be a mainframe computer, minicomputer or microcomputer having one or more microprocessors. A server computer 12 may at times function as a client computer accessing another server computer 12. The remote network 16 may be a local area network, a network added into the wide area network through an independent service provider (ISP) for the internet, or another group of computers interconnected by wired or wireless transfer media having a configuration which is either fixed or changing over time. Client computers 14 may link into and access the network 10 independently or through a remote network 16.

Computer System

Figure 2:
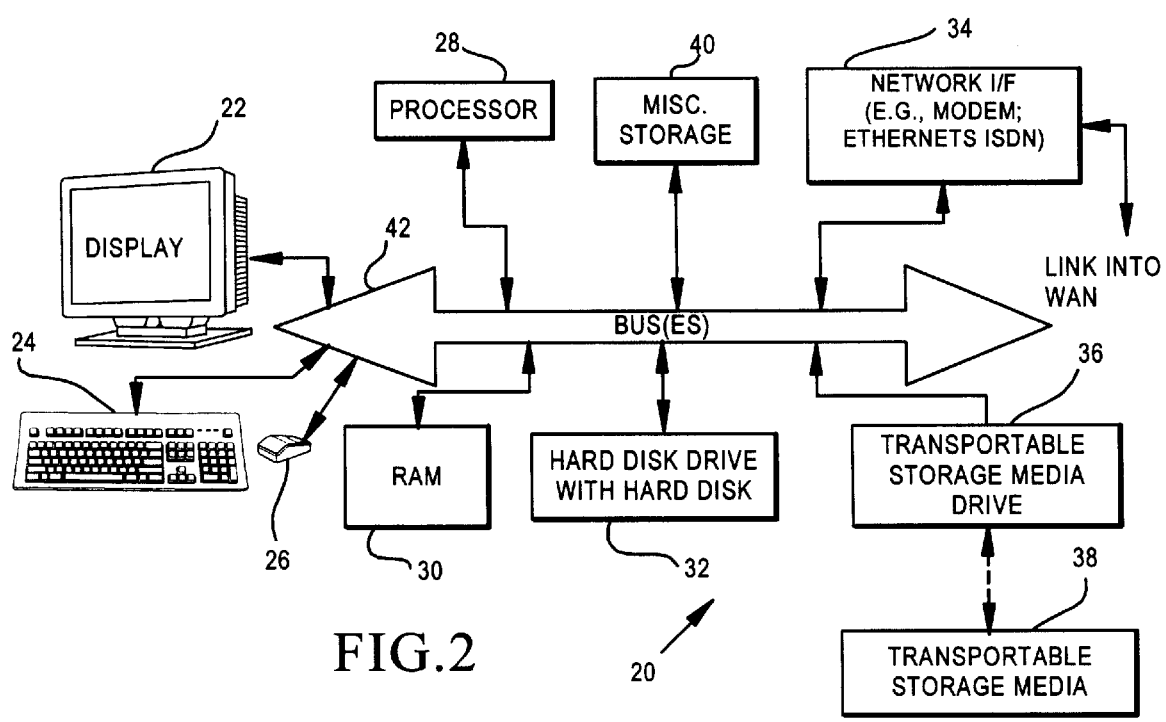
FIG. 2 is a block diagram of a computer system for a computer connected into the client-server network of FIG. 1.

The functions of the present invention preferably are performed by programmed digital computers of the type which are well known in the art, an example of which is shown in FIG. 2. A computer system 20 has a display monitor 22, a keyboard 24, a pointing/clicking device 26, a processor 28, random access memory (RAM) 30, a non-volatile storage device such as a hard disk drive 32, a communication or network interface 34 (e.g., modem; ethernet adapter), and a transportable storage media drive 36 which reads transportable storage media 38. In addition other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the keyboard 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

Load Balancing

To access data over the world wide web, for example, a client computer specifies a uniform resource locator (URL), which is an address for the data. Such address includes the address of a computer which stores the data. The server computers 12 in the client-server network 10 are subject to a varying load depending on the access requests at any given time from the client computers 14. If many client computers 14 desire to access the same data at the same time, then many of the client computers 14 may be delayed. Conventionally, one manner in which such demand is handled is by using caches at other computers. An independent service provider, for example, may keep a copy of popular web pages in their resident cache. Another manner, as described in the background section, is to include a hardware load balancing device which responds to accesses for a given address. Multiple servers are coupled to the hardware load balancing device. A request from a client computer is routed to one of such servers through the load balancing device. In effect the server computers coupled to the load balancing device have the same address. Consider an example in which 10 server computers are coupled to a hardware load balancing device. Such device implements an algorithm to determine how to apportion the load (e.g., the requests to such common address) among the 10 computers. The apportionment may be a simple equal division (e.g., 10%), or may be according to some algorithm (e.g., round robin, random selection, a mathematical formula). These approaches are server side load balancing approaches, meaning the determination is made at the server side of the network.

A percentage load for a given server computer may be based on the connect time to the given computer relative to the available connect time among all the computers whose load is being balanced. Alternatively, instead of relative connect time, load may be based upon a relative download volume, or a relative number of connections (regardless of length of connect time for each connection).

Figure 3:
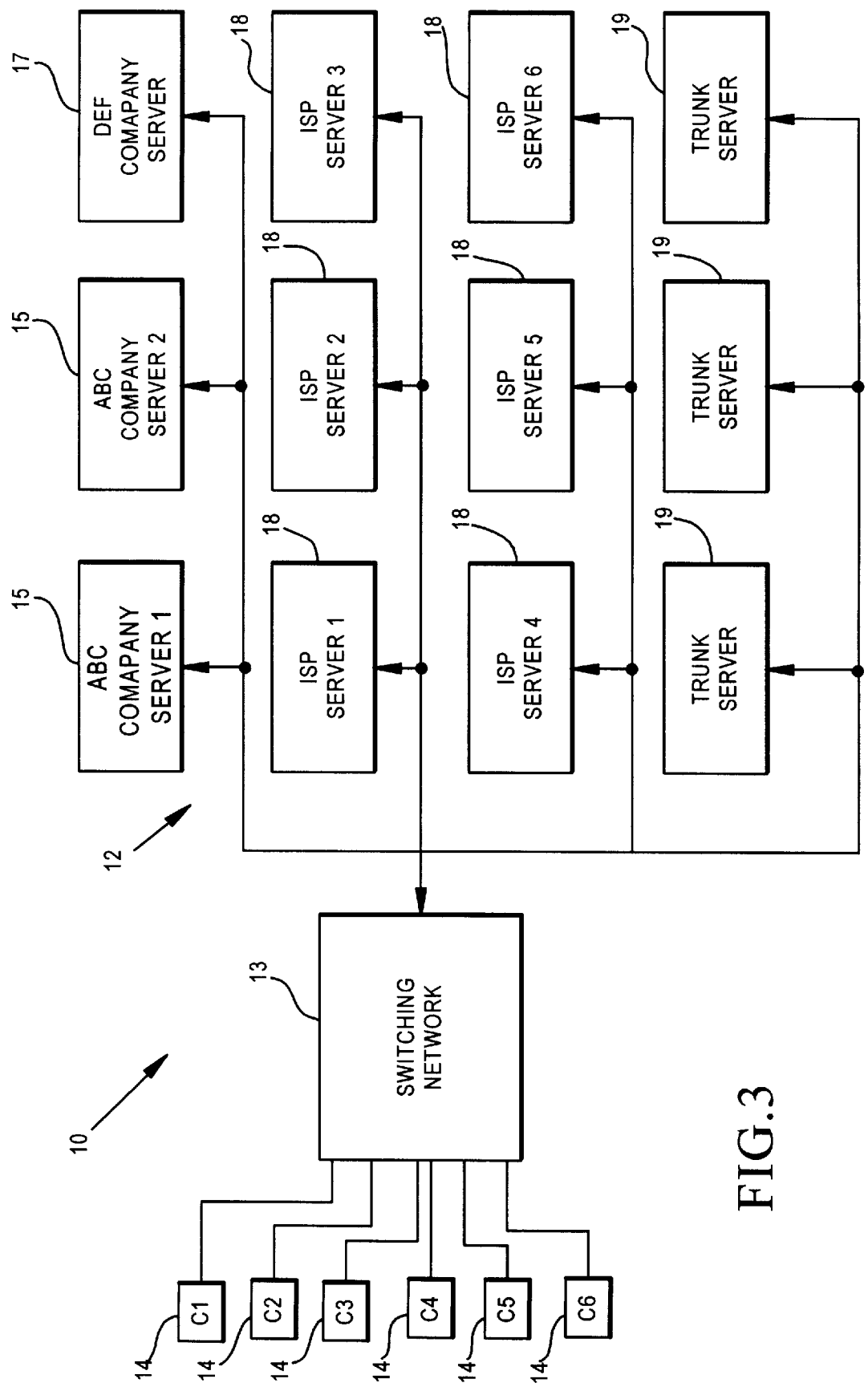
FIG. 3 is a diagrammatic view of the network of FIG. 1.

FIG. 3 shows the client-server network 10 having a plurality of client computers 14 labeled as C1–C6 and a plurality of server computers 12. A packet switched network 13 allows any client computer 14 to communicate directly or indirectly to a server computer 12. For the INTERNET, the server computers 12 include trunk server computers 19, independent service providers (ISP) server computers 18, and varying company server computers 15, 16.

A given block of data offered over the client-server INTERNET network is controlled by a given person or company. For example, the ABC Company may offer publicly accessible data from their web pages over the INTERNET. Because of popularity of another reason, the ABC Company needs to locate the data on multiple server computers to handle all the demand of client computers seeking to access their web site. The ABC Company stores redundant copies of the web site data on each of multiple servers. According to an aspect of this invention, such servers have differing addresses. Apportionment of the load to determine which server is accessed by which client computer request is determined at the client computers 14.

Each client computer 14 stores a load balance list. Referring to FIG. 4A, in one example, common data is stored on each of ISP servers 1–4. The load balance list includes an identification of the server computers, such as an address. In some instances the list also include a respective load percentage for each of the listed ISP server computers. The percentage specified in the list for any given server computer may be the same or different than for the other servers identified in the list. Preferably the percentages should add up to 100%. FIG. 4A, for example shows a load balance list in which the load is to be divided equally among four ISP server computers 18 (i.e., ISP servers 1–4). Each server in the list includes common data that may be accessed by a client computer. In some embodiments, servers may be identified as uplink servers, downlink servers or both uplink and downlink servers.

In some embodiments, each client computer also stores an emergency back-up load balance list. This list is used in the event that a client computer 14 is unable to connect to any of the servers in the normal load balance list. Accordingly, at least one of the servers identified in the emergency back-up load balance list should differ from the servers identified in the normal load balance list. Referring to FIG. 5, an exemplary emergency load balance list includes the data owners own computer servers 15 (e.g., ABC Company servers 1 and 2). One or more other server computers such as an ISP server 18 may be used in addition or instead.

Method for Client Side Load Balancing

Figure 6:
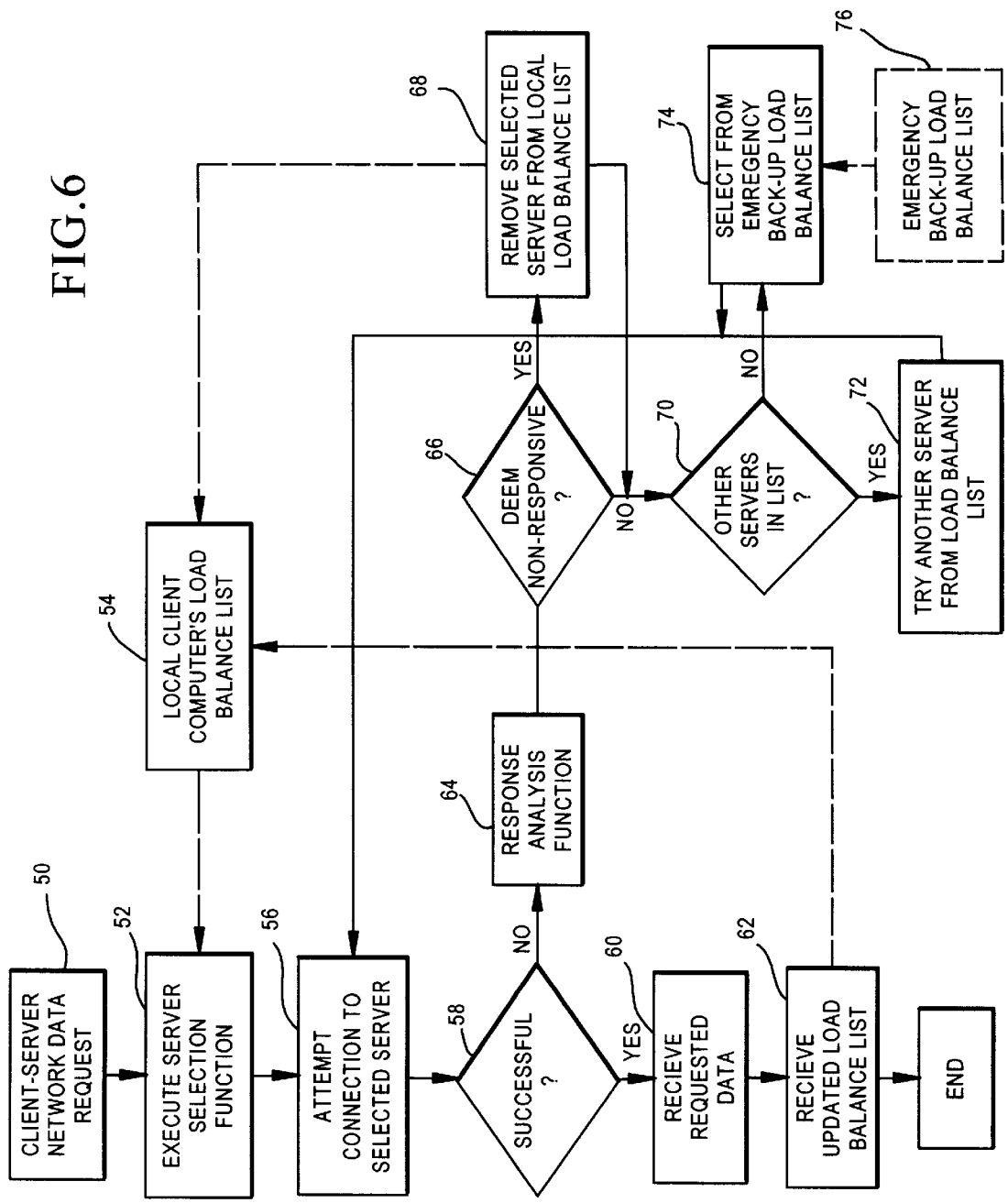
FIG. 6 is a flow chart of a method for load balancing according to an embodiment of this invention.

Referring to FIG. 6, a method for client-side load balancing includes a step 50 in which a client computer 14 requests to access data over the client-server network 10. At another step 52, the client computer 14 executes a server selection function to determine which server 12 to access. A processor 28, for example, reads the load balance list 54 resident on the client computer 14. The server selection function determines which server identified in the list 54 is to be accessed to handle the pending data request. For an embodiment in which there is a load percentage included in the list 54, such percentages are seeds for the server select function. Over time as the server select function is executed over and over, the actual load percentage for each server computer in the list 54 converges to the specified percentage in the list 54. According to an alternative scheme, the load select function may randomly select one of the servers in the list 54 or perform a round-robin selection, or perform some mathematical computation.

Once a server is selected, at step 56 a network connection is attempted to connect the client computer 14 to the selected server computer 12. At step 58 the connect operation is tested to determine if successful. If the connection is successful, then at step 60 the data is read from the server computer 12 and downloaded to the client computer 14. In addition, during each connection or at regularly determined times or connections, an updated load balance list also is received from the accessed server computer 12. The updated list replaces the prior load balance list stored at the client computer 14. As shown in FIG. 4B the updated load balance list may add an additional server and alter the load balance percentages. Alternatively, the updated list may remove a server or just alter the load balance percentages. Thus, one or more servers can be added or removed and load balance percentages can be altered.

Each server computer 12 in the list 54 also includes a load balance list. A system administrator regularly updates the load balance list, at each server computer 12 which is to store common data (e.g., ABC Company data) accessible from the client computer 14. For example, if demand gets heavy, an additional server 12 can be added in by including its identification in the updated load balance list of each participating server 12. Similarly, the system administrator can remove a server or change a load percentage for any one or more participating servers. The updated list gets distributed to a client computer on the client computer's access to a participating server 12.

In some instances, the attempt to connect to a server at step 56 may fail. This may occur because the server is not longer a participating server, or because the server is down, or for some other reason. If the connection and access is unsuccessful, then at step 64 a response analysis is performed. The response analysis determines at step 66 whether the server should be deemed non-responsive and thus removed from the load balance list 54 at step 68, or whether to simply try another server. In one embodiment a server is deemed non-responsive if the data is not present at the server or if the connection fails after a prescribed number of tries. If the response analysis results in the server being found non-responsive then the server is removed from the load balance list of the local client computer which made the determination. Whether responsive or non-responsive, the list 54 then is checked at step 70 to determine if there another server 12 on the load balance list. If yes, then at step 72 connection to another server in the list 54 is attempted. The operation then continues with the test at step 58. If the check at step 70 results in a determination that no others servers are identified in the list 54, then at step 74 a server 15 from the emergency back-up load balance list 76 is accessed. The client computer 14 then accesses the data directly from the identified server 15, or merely receives an updated load balance list 54 and tries again.

Note that a client computer may include multiple load balance lists. One load balance list may be used for determining access to one set of data (e.g., ABC Company data) over the client-server network 10, while another load balance list is used for determining access to another set of data. The servers in each list may be the same or differ.

According to an alternative embodiment, a permanent load balancing list is loaded into or received at each client computer. Thereafter, such list is used until all computers on the list are found to be non-responsive or until a specific communication is received from a server computer specifying that the list is to be changed. For example, the server computer may indicate that the load balance list is to be replaced with an accompanying load balance list. For the case where all servers on the list are found to be non-responsive, the client computer accesses the emergency server list. A communication with an emergency server then results in transmission of an updated load balance list to the client computer.

For a load balancing method in which load balancing lists distinguish between uplink servers and downlink servers, the specified downlink servers are used by the server selection function for normal downlink access to the client-server network. For uplink operations, for example, in which client computers uplink information to a server for a proprietary or other reason, only uplink servers identified in the load balance list are used by the server selection function. A connection then is achieved with the uplink server and appropriate information is sent from the client computer to the server computer.

Meritorious and Advantageous Effects

According to an advantage of this invention, the client side load balancing method does not suffer from a single point of failure which cripples the entire delivery system. With servers located in different geographic regions, even natural disasters and power failures at one or more servers will not disable network delivery of data to an operable client computer. Servers can be added or removed in a smooth transition without disrupting delivery of data. Load can be spread among hundreds of servers at reduced cost to the vendor. Vendors can ramp up or ramp down throughput capacity as needed using load capacity of independent service provider computers.

An advantage of the emergency list scheme is that a vendor might own the lines and addresses for the servers on the emergency list, but rent the lines from an independent service provider for the servers in the load balance list. As a result, a vendor is not held hostage to the addresses which the independent service provider owns. More specifically if the vendor chooses to switch service providers because of price, service or another reason, the vendor can do so without adversely impacting client access to the vendor's data. The vendor simply updates the load balance list. Even absent a transition time to get updated load balance lists to the client computers, a client that has not checked in for a while will still get to the emergency list and then get an updated load balance list.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method of apportioning load in a client server network having a first plurality of server computers, wherein load is apportioned among a second plurality of the server computers, the second plurality of server computers being a subset of the first plurality of server computers, the method comprising the steps of:

storing a load balance list on each server computer of the second plurality of server computers;

storing common data on each server computer of the second plurality of server computers;

for each one of a plurality of client computers connecting to the client server network, receiving the load balance list from a server computer of the second plurality of server computers;

performing a server selection function at a given client computer among the plurality of client computers using data from the received load balance list to identify a select server computer among the second plurality of server computers;

responsive to the performing step, accessing the common data from the select server computer with the given client computer; and updating the load balance list for the client server network, the step of updating comprising the steps of:
    (i) storing an updated load balance list on each one of a third plurality of server computers among the first plurality of server computers, wherein the updated load balance list identifies each server computer of the third plurality of server computers; and
    (ii) receiving at one or more of the plurality of client computers the updated load balance list from a server computer of the third plurality of server computers;

wherein the step of performing the server selection function at a given client computer among the plurality of client computers uses data from the received updated load balance list to identify a select server computer among the third plurality of server computers.

2. The method of claim 1, in which the third plurality of server computers is a subset of the second plurality of server computers.

3. The method of claim 1, in which the third plurality of server computers is a subset of the second plurality of sever computers combined with at least one of the first plurality of server computers which is not among the second plurality of server computers.

4. A method of apportioning load in a client server network having a first plurality of server computers, wherein load is apportioned among a second plurality of the server computers, the second plurality of server computers being a subset of the first plurality of server computers, the method comprising the steps of:

storing a load balance list on each server computer of the second plurality of server computers;

storing common data on each server computer of the second plurality of server computers;

for each one of a plurality of client computers connecting to the client server network, receiving the load balance list from a server computer of the second plurality of server computers;

performing a server selection function at a given client computer among the plurality of client computers using data from the received load balance list to identify a select server computer among the second plurality of server computers; and responsive to the performing step, accessing the common data from the select server computer with the given client computer;

wherein the step of storing a load balance list comprises the step of storing a first load balance list on at least one server computer among the second plurality of server computers, and storing a second load balance list different from the first load balance list on at least one other server computer among the second plurality of server computers.

5. A method of apportioning load in a client server network having a first plurality of server computers, wherein load is apportioned among a second plurality of the server computers, the second plurality of server computers being a subset of the first plurality of server computers, the method comprising the steps of:

storing a load balance list on each server computer of the second plurality of server computers;

storing common data on each server computer of the second plurality of server computers;

for each one of a plurality of client computers connecting to the client server network, receiving the load balance list from a server computer of the second plurality of server computers;

performing a server selection function at a given client computer among the plurality of client computers using data from the received load balance list to identify a select server computer among the second plurality of server computers; and responsive to the performing step, accessing the common data from the select server computer with the given client computer;

wherein the load balance list is a first load balance list, and further comprising the steps of:
 (i) storing a back-up load balance list on a plurality of client computers, wherein the back-up load balance list identifies at least one server computer not among the second plurality of server computers;
 (ii) determining by one of the plurality of client computers which stores the back-up load balancing list that all server computers identified in the first load balance list are non-responsive; and
 (iii) connecting said one of the plurality of client computers to a server computer identified in the back-up load balance list.

6. The method of claim 5, further comprising the steps of receiving an updated load balance list at said one of the plurality of client computers from the server computer to which said one of the plurality of client computers is connected.

7. A client server network, comprising:

a plurality of server computers;

a plurality of client computers;

a load balance list identifying a subset of the plurality of server computers, wherein the load balance list is stored at one of the plurality of client computers, wherein the load balance list is a first load balance list, common data stored at each one server computer of the server computers identified in the first load balance list;

processing means at said one of the plurality of client computers which executes a selection function to select one server computer of the server computers identified in the first load balance list, wherein the selection function apportions load among the server computers identified in the first load balance list;

means for connecting said one of the plurality of client computers to the selected one server computer to access a portion of the common data;

a back-up load balance list stored at said one of the plurality of client computers, wherein the back-up load balance list identifies at least one server computer not identified in the first load balance list;

means for determining at said one of the plurality of client computers that all server computers identified in the first load balance list are non-responsive; and means for connecting said one of the plurality of client computers to a server computer identified in the back-up load balance list.

8. The network of claim 7, further comprising means for receiving an updated load balance list at said one of the plurality of client computers from the server computer to which said one of the plurality of client computers is connected.

* * * * *